United States Patent
Du et al.

(10) Patent No.: US 7,741,611 B2
(45) Date of Patent: Jun. 22, 2010

(54) RADIATION DETECTOR POWER MANAGEMENT FOR PORTABLE/HANDHELD APPLICATIONS

(75) Inventors: Yanfeng Du, Rexford, NY (US); Naresh Kesavan Rao, Clifton Park, NY (US); Brian David Yanoff, Niskayuna, NY (US); Wen Li, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 167 days.

(21) Appl. No.: 12/220,230

(22) Filed: Jul. 23, 2008

(65) Prior Publication Data
US 2010/0019163 A1 Jan. 28, 2010

(51) Int. Cl.
*G01T 1/24* (2006.01)
(52) U.S. Cl. .................. 250/371; 250/370.01
(58) Field of Classification Search ............ 250/370.01, 250/370.07, 370.09, 371
See application file for complete search history.

(56) References Cited

U.S. PATENT DOCUMENTS

| | | | |
|---|---|---|---|
| 5,132,543 A | 7/1992 | Valentine et al. | 250/388 |
| 5,757,227 A | 5/1998 | McQuaid et al. | 327/561 |
| 6,097,243 A | 8/2000 | Bertin et al. | 327/544 |
| 6,781,134 B1 | 8/2004 | Murray et al. | 250/370.13 |
| 7,009,182 B2 | 3/2006 | Kannan et al. | 250/370.07 |
| 7,064,338 B2 | 6/2006 | El-Hanany et al. | 250/374 |
| 7,250,927 B2 | 7/2007 | Yamazaki et al. | 345/76 |
| 7,291,841 B2 | 11/2007 | Nelson et al. | 250/370.09 |
| 2003/0105397 A1 | 6/2003 | Tumer et al. | 600/436 |

*Primary Examiner*—David P Porta
*Assistant Examiner*—Mark R Gaworecki
(74) *Attorney, Agent, or Firm*—Scott J. Asmus

(57) ABSTRACT

A radiation detector includes at least one multiple channel pixelated detector driven via a plurality of pixelated anode electrodes and at least one planar cathode electrode. Each detector is configured to reduce the number of active pixelated anode electrodes until a rate of events detected via at least one corresponding planar cathode electrode exceeds a preset threshold above a background count rate within a predetermined time period.

22 Claims, 3 Drawing Sheets

RADIATION DETECTOR POWER MANAGEMENT FOR PORTABLE/HANDHELD APPLICATIONS

STATEMENT REGARDING FEDERALLY SPONSORED RESEARCH & DEVELOPMENT

This invention was made with U.S. Government support under contract number HSHQDC06C0089. The Government has certain rights in the invention.

BACKGROUND

The invention relates generally to radiation detectors, and more specifically to a power management technique for radiation detectors with multiple channel ASIC or discrete readout electronics.

In a radiation detector that employs a multiple channel ASIC readout, the number of readout channels is set by the detector position resolution requirement and/or the need to correct the material non-uniformity, which is common for most of the high band gap semiconductor materials such as CZT, CdTe and HgI2. If the number of required ASIC channels is on the order of hundreds, and even if each channel consumes only a few milliwatts of power, the total power consumption for the readout ASIC could be on the order of a few Watts or more. For portable/handheld applications, a large power consumption requires a big battery, or the device can be used for only a short period of time before the battery has to be recharged or replaced.

One common approach to minimize power consumption associated with a radiation detector requires periodically putting the ASIC into a low power sleep mode. This solution is problematic however, since the detector is not sensitive to the radiation source while it is in the sleep mode. The radiation detector thus may miss detection of the presence of a radiation source.

In view of the foregoing, it would be advantageous to provide a method of minimizing power consumption associated with a radiation detector that avoids the above problems.

BRIEF DESCRIPTION

Briefly, in accordance with one embodiment, a method of radiation detector power management comprises:

providing a radiation detector comprising a multiple channel pixellated readout driven via a plurality of pixellated anode electrodes and at least one planar cathode electrode;

providing continuous full power to at least one planar cathode electrode; and maintaining all pixellated anode electrodes in an unpowered or low power monitoring mode until a rate of events detected via at least one planar cathode electrode exceeds a preset threshold above a background count rate within a predetermined time period, and then providing full power to the pixellated anode electrodes when the rate of events detected via at least one planar cathode electrode exceeds the preset threshold within the predetermined time period, such that the ratio of anode electrode on time to cathode electrode on time is reduced to reduce the number of active channels during the monitoring mode.

According to another embodiment, a method of radiation detector power management comprises:

providing a radiation detector comprising a multiple channel pixellated readout driven via a plurality of pixellated anode electrodes and at least one planar cathode electrode; and reducing the number of active pixellated anode electrodes until a rate of events detected via at least one planar cathode electrode exceeds a preset threshold above a background count rate within a predetermined time period, and then activating all the pixellated anode electrodes when the rate of events detected via at least one planar cathode electrode exceeds the preset threshold within the predetermined time period, such that the ratio of anode electrode on time to cathode electrode on time causes a corresponding reduction in the number of active channels when the rate of events detected via at least one planar cathode electrode does not exceed the preset threshold within the predetermined time period.

According to yet another embodiment, a radiation detector comprises at least one multiple channel pixellated detector driven via a plurality of pixellated anode electrodes and at least one planar cathode electrode, wherein each detector is configured to reduce the number of active pixellated anode electrodes until a rate of events detected via at least one corresponding planar cathode electrode exceeds a preset threshold above a background count rate within a predetermined time period.

According to still another embodiment, a radiation detector comprises at least one multiple channel pixellated detector driven via a plurality of pixellated anode electrodes and at least one planar cathode electrode, wherein each detector is configured to provide continuous full power to at least one corresponding planar cathode electrode, and is further configured to maintain all corresponding pixellated anode electrodes in an unpowered or low power monitor mode until a rate of events detected via at least one corresponding planar cathode electrode exceeds a preset threshold above a background count rate within a predetermined time period.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
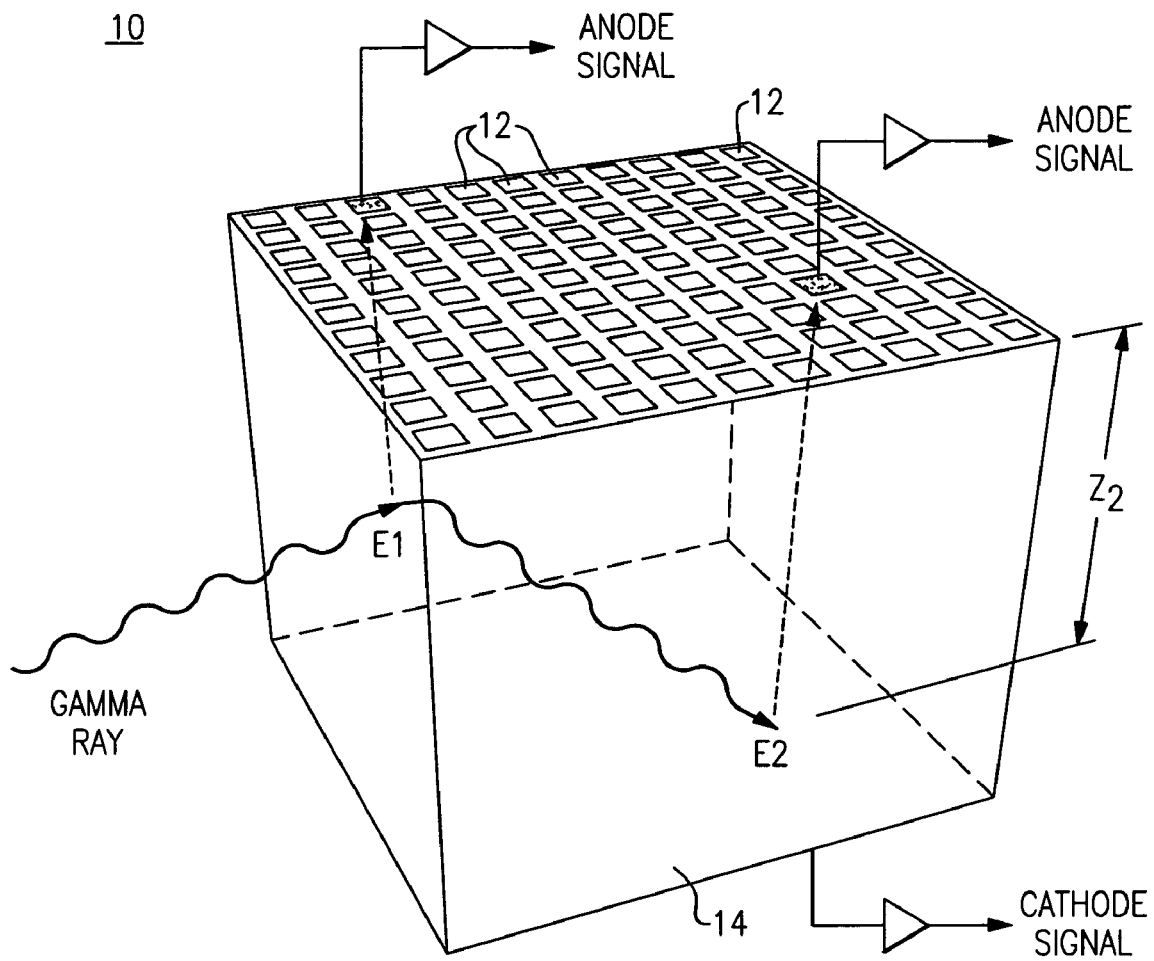
FIG. 1 illustrates a pixellated semiconductor detector that is known in the art.

FIG. 1 illustrates a pixellated semiconductor detector 10 that is known in the art. Pixellated semiconductor detectors known in the art require only pixellated anode electrodes 12 and a simple planar cathode electrode 14 in order to obtain the lateral position information for imaging applications or spectral corrections for a material non-uniformity. Only those anode electrodes 12 directly above the interaction locations such as E1 and E2 in FIG. 1 will collect charge and have signals for any gamma interactions within the detector volume, while the cathode electrode 14 will always have a signal for any interactions.

The present inventors recognized that since a pixellated semiconductor detector cathode electrode is sensitive to any events within the detector volume, all of the associated anode electrode readout channels can be shut down or deactivated or put in a low power mode, while only the cathode electrode readout channel need remain in full power operation to achieve a low power monitoring mode. This power management technique is described in more detail below with reference to FIGS. 2 and 3. Further, it shall be understood that while particular embodiments are described herein with reference to use of a single planar cathode electrode, the novel principles apply equally well also to embodiments that employ cathode electrodes segmented into two or more parts.

Figure 2:
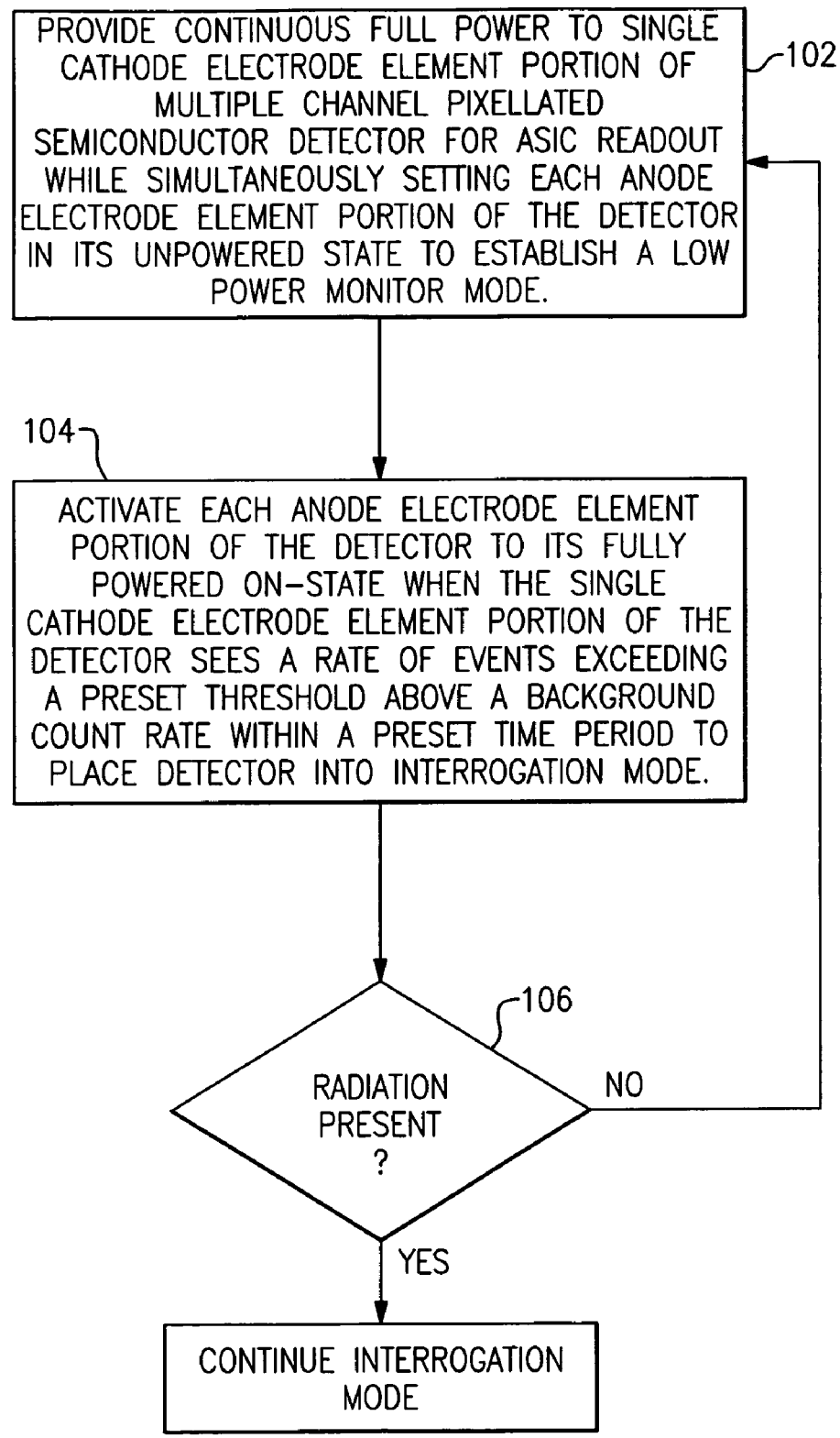
FIG. 2 is a flow chart illustrating a method power management for portable/handheld radiation detectors having a multiple channel pixellated ASIC readout, according to one embodiment of the invention.

FIG. 2 is a flow chart illustrating a method power management 100 for portable/handheld radiation detectors having a multiple channel pixellated ASIC readout, according to one embodiment of the invention. The present invention is not so limited however; and a discrete electronics readout can just as easily be used for the radiation detector. According to one aspect when using a pixellated semiconductor detector, each pixellated semiconductor detector is constructed using any semiconductor material which is sensitive to the incoming radiation to be imaged, and may include without limitation, cadmium zinc telluride (CZT), CdTe and HgI2. Although a pixellated semiconductor detector is described above, a gas detector or a scintillator can just as easily be used to implement the embodiments described herein.

The method 100 commences by setting the cathode electrode readout channel of a radiation detector multiple channel ASIC readout in a fully powered on-state while simultaneously setting each of the anode electrode readout channels of the radiation multiple channel ASIC readout in an unpowered off-state, to achieve a low power monitoring mode as represented in block 102. Other embodiments may set less than all of the anode electrode readout channels of the radiation multiple channel ASIC readout in an unpowered off-state to achieve a desired low power monitoring mode.

While the cathode electrode readout channel is in its fully powered on-state, it is sensitive to any radiation interactions in the detector 10 volume and will be able to monitor the rate of events such as photon counting events known by those skilled in the radiation detection art. When this rate of events seen by the cathode electrode exceeds a preset threshold above a background count rate within a preset time period, the radiation detector determines there is a possible presence of some radioactive source(s) and commences to activate each anode electrode readout channel to its fully powered on-state (active mode) at which time the radiation detector is placed into an active interrogation mode, as represented in block 104.

Once in the active interrogation mode, spectral information from the anode detector channels helps the radiation detector confirm the existence of real radioactive sources. If the spectral information confirms the presence of real radioactive materials, the radiation detector will stay in its active mode and operate to capture additional data that will improve an isotope identification confidence level and determine the source location. If after some predetermined period of time, the system determines there is no radioactive source(s), it can switch back into the low power monitor mode, setting each of the anode electrode readout channels of the radiation multiple channel ASIC readout into an unpowered off-state, as represented in block 106.

Because the channel ratio between anode and cathode is between about 30 and about 100-200, the resultant power saving achieved during the low power monitor mode is very significant. Further, if one channel consumes 10 milliwatts of power, the multiple channel ASIC readout will typically require only about 10-100 milliwatts of power in the low power monitor mode, depending upon the number of detector modules being employed.

Powering down all the anode electrode channels during the low power monitor mode may affect the radiation detector operating conditions. Hence, when all anode electrode channels are powered down during the low power monitor mode, it is desirable to provide a replica voltage sufficient to hold each anode electrode operating voltage close to what it should be during the active interrogation mode to ensure rapid stabilization of the pixellated detector and its associated electronics during power up.

Because the cathode electrode is sensitive to any events within the detector volume, even in the low power mode, the radiation detector advantageously maintains its intrinsic efficiency so that the system will not miss any potential radioactive sources during the low power mode.

Figure 3:
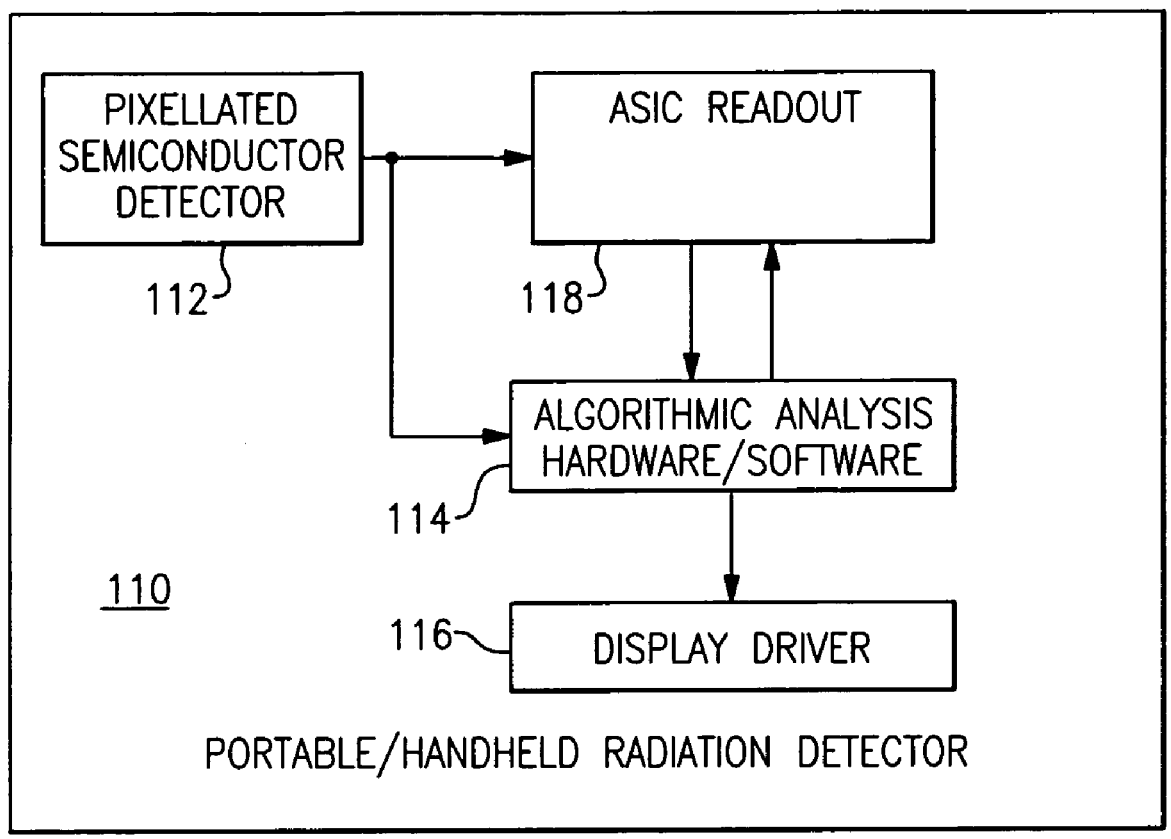
FIG. 3 is a simplified block diagram that depicts a portable/handheld radiation detector, according to one embodiment of the invention.

FIG. 3 is a simplified block diagram depicting a portable/handheld radiation detector 110 according to one embodiment of the invention. Radiation detector 110 includes a pixellated semiconductor detector 112 that may include several detector elements constructed in similar fashion to the pixellated semiconductor detector 10 shown in FIG. 1. The algorithmic analysis hardware and software 114 in combination with a display driver 116 is configured to analyze the signals generated via the pixellated semiconductor detector 112 and provide power to the multiple channel ASIC readout 118 as described above with reference to FIG. 2.

Since pixellated semiconductor detectors, display drivers and multiple channel ASIC readouts are well known in the art, further details of such devices will not be further described herein to preserve brevity and to enhance the clarity of the novel methods and structures described herein. The algorithmic hardware/software 114 may include a data processing unit such as a CPU or a DSP, among others, in combination with any number of suitable memory units, including without limitation, RAM, ROM, EEPROM, and so forth. The algorithmic hardware/software 114 may further include ASICs, ADCs, DACs, line drivers, logic devices, buffers, and any other suitable hardware/firmware devices suitable to implement the methods described herein.

When the algorithmic software is configured as described above with reference to FIG. 2, the portable/handheld radiation detector 110 will function to provide a power management scheme that advantageously will not cause the detector 110 to miss any potential radioactive sources while it is operating in its low power monitor mode.

While only certain features of the invention have been illustrated and described herein, many modifications and changes will occur to those skilled in the art. It is therefore, to be understood that the appended claims are intended to cover all such modifications and changes as fall within the true spirit of the invention. The principles described above can, for example, be used with other types of radiation detectors with multiple channel readouts that may include without limitation, semiconductor, scintillator, and gas detectors, in which the readout electronics could be implemented using an ASIC or discrete electronics.

The invention claimed is:

1. A method of radiation detector power management comprising:
   providing a radiation detector with a plurality of pixellated anode electrodes and at least one planar cathode electrode;
   providing continuous full power to the at least one planar cathode electrode; and
   maintaining all pixellated anode electrodes in an unpowered or low power monitor mode until a rate of events detected via the at least one planar cathode electrode exceeds a preset threshold above a background count rate within a predetermined time period; and
   providing full power to the pixellated anode electrodes when the rate of events detected via at least one planar cathode electrode exceeds the preset threshold within the predetermined time period, such that the ratio of anode electrode on time to cathode electrode on time is reduced during a monitor mode.

2. The method according to claim 1, wherein the rate of events correspond to photon counting events above a preset low energy threshold.

3. The method according to claim 1, further comprising driving a multiple channel readout in response to signals generated via the plurality of pixellated anode electrodes and at least one planar cathode electrode such that only a cathode readout portion of the multiple channel readout remains in full power mode during the low power monitor mode.

4. The method according to claim 3, wherein the multiple channel readout is selected from an ASIC readout and a discrete electronics readout.

5. The method according to claim 1, further comprising providing a replica voltage sufficient to hold each anode electrode operating voltage close to what it should be during the active interrogation mode to ensure rapid stabilization of the radiation detector during power up from its low power monitor mode.

6. A method of radiation detector power management comprising:
   providing a radiation detector with a plurality of pixellated anode electrodes and at least one planar cathode electrode; and
   reducing the number of active pixellated anode electrodes until a rate of events detected via at least one planar cathode electrode exceeds a preset threshold above a background count rate within a predetermined time period; and
   increasing the number of active pixellated anode electrodes when the rate of events detected via at least one planar cathode electrode exceeds the preset threshold within the predetermined time period, such that the ratio of anode electrode on time to cathode electrode on time causes a corresponding reduction in the number of active electrode channels when the rate of events detected via at least one planar cathode electrode does not exceed the preset threshold within the predetermined time period.

7. The method according to claim 6, wherein the rate of events correspond to photon counting events above a preset low energy threshold.

8. The method according to claim 6, further comprising driving a multiple channel readout in response to signals generated via the plurality of pixellated anode electrodes and at least one planar cathode electrode such that only a cathode readout portion of the multiple channel readout remains in full power mode during the low power monitor mode.

9. The method according to claim 8, wherein the multiple channel readout is selected from an ASIC readout and a discrete electronics readout.

10. The method according to claim 6, further comprising providing a replica voltage sufficient to hold each anode electrode operating voltage close to what it should be during the active interrogation mode to ensure rapid stabilization of the radiation detector during power up from its low power monitor mode.

11. A radiation detector comprising at least one multiple channel pixellated detector driven via a plurality of pixellated anode electrodes and at least one planar cathode electrode, wherein each detector is configured to reduce the number of active pixellated anode electrodes until a rate of events detected via at least one corresponding planar cathode electrode exceeds a preset threshold above a background count rate within a predetermined time period.

12. The radiation detector according to claim 11, wherein at least one multiple channel pixellated detector is selected from at least one of a semiconductor detector, a gas detector, or a scintillator.

13. The radiation detector according to claim 11, wherein each detector is further configured to increase the number of corresponding active pixellated anode electrodes when the rate of events detected via at least one corresponding planar cathode electrode exceeds the preset threshold within the predetermined time period, such that the ratio of corresponding anode electrode on time to corresponding cathode electrode on time causes a corresponding reduction in the number of active electrode channels when the rate of events detected via at least one planar cathode electrode does not exceed the preset threshold within the predetermined time period.

14. The radiation detector according to claim 11, wherein each inactive pixellated anode electrode is operational with a replica voltage sufficient to hold its operating voltage close to what it should be during its active mode to ensure rapid stabilization of the radiation detector during power up from its inactive mode.

15. The radiation detector according to claim 11, further comprising a multiple channel readout configured to be responsive to signals generated via the plurality of pixellated anode electrodes and at least one planar cathode electrode such that only a cathode readout portion of the multiple channel readout remains in full power mode during the low power monitor mode.

16. The radiation detector according to claim 15, wherein the multiple channel readout is selected from an ASIC readout and a discrete electronics readout.

17. A radiation detector comprising at least one multiple channel pixellated detector driven via a plurality of pixellated anode electrodes and at least one planar cathode electrode, wherein each detector is configured to provide continuous full power to at least one corresponding planar cathode electrode, and is further configured to maintain all corresponding pixellated anode electrodes in an unpowered monitor mode until a rate of events detected via at least one corresponding planar cathode electrode exceeds a preset threshold above a background count rate within a predetermined time period.

18. The radiation detector according to claim 17, wherein each detector is further configured to increase the number of corresponding powered pixellated anode electrodes when the rate of events detected via at least one corresponding planar cathode electrode exceeds the preset threshold within the predetermined time period, such that the ratio of anode electrode on time to cathode electrode on time causes a corresponding reduction in the number of active electrode channels when the rate of events detected via at least one corresponding planar cathode electrode does not exceed the preset threshold within the predetermined time period.

19. The radiation detector according to claim 17, further comprising a multiple channel readout configured to be responsive to signals generated via the plurality of pixellated anode electrodes and at least one planar cathode electrode such that only a cathode readout portion of the multiple channel readout remains in full power mode during the low power monitor mode.

20. The radiation detector according to claim 19, wherein the multiple channel readout is selected from an ASIC readout and a discrete electronics readout.

21. The radiation detector according to claim 17, wherein at least one multiple channel pixellated detector is selected from a semiconductor detector, a gas detector, and a scintillator.

22. The radiation detector according to claim 17, wherein each unpowered pixellated anode electrode is operational with a replica voltage sufficient to hold its operating voltage close to what it should be during its powered mode to ensure rapid stabilization of the radiation detector during power up from its monitor mode.

* * * * *